Aug. 16, 1932.   E. BURMEISTER   1,871,493
CONDENSING LOCOMOTIVE
Filed April 19, 1929   2 Sheets-Sheet 1

Inventor
Erich Burmeister
By
Knight Bros
Attorneys

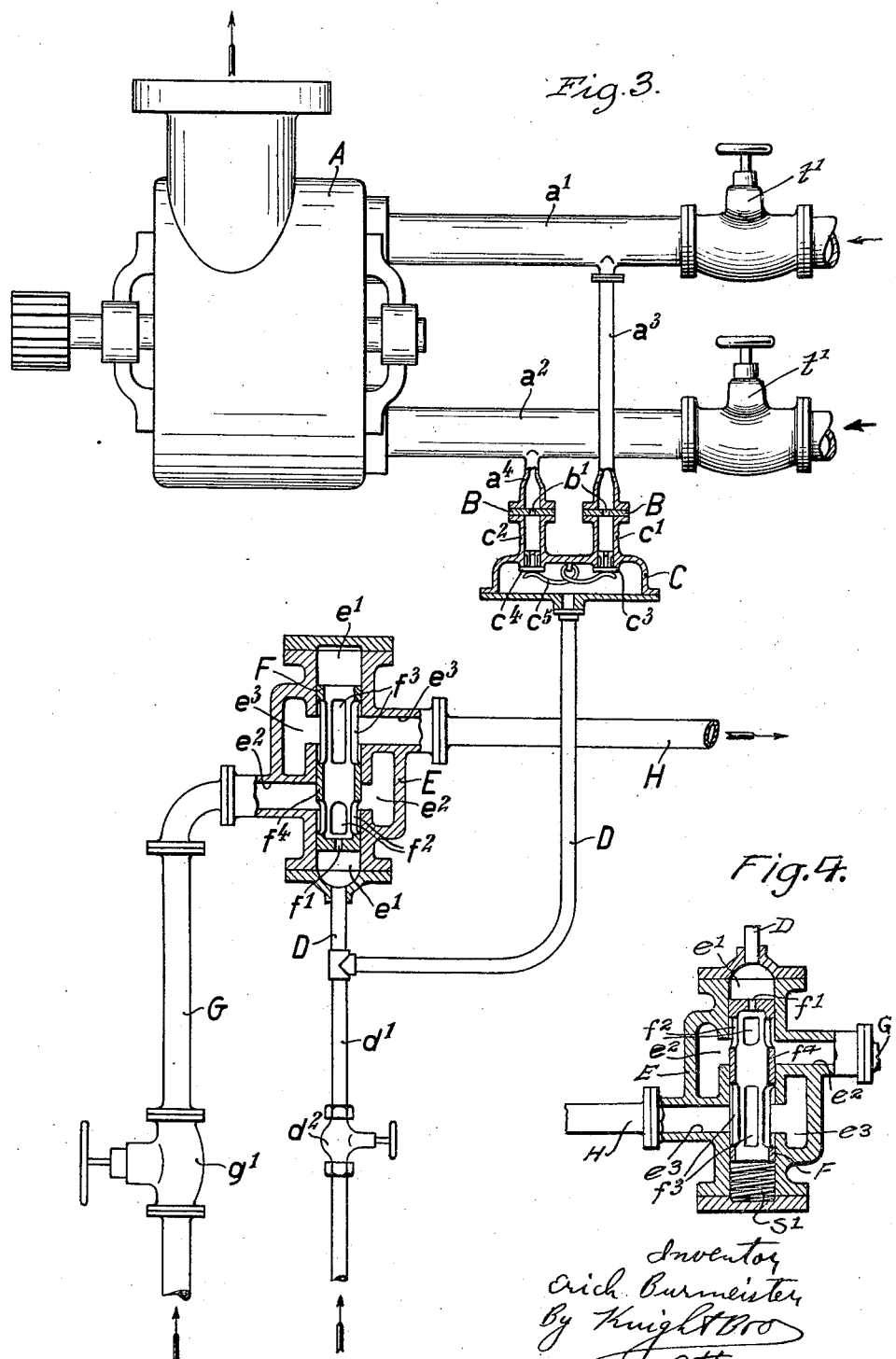

Patented Aug. 16, 1932

1,871,493

UNITED STATES PATENT OFFICE

ERICH BURMEISTER, OF ZURICH, SWITZERLAND, ASSIGNOR TO FRIED. KRUPP AKTIEN-GESELLSCHAFT, OF ESSEN-ON-THE-RUHR, GERMANY

CONDENSING LOCOMOTIVE

Application filed April 19, 1929, Serial No. 356,551, and in Germany June 7, 1928.

The invention relates to condensing locomotives. In locomotives of this type, the re-cooling plant for the condenser cooling water or for the condenser, if the latter is cooled by air, generally is fanned by means of a mechanically driven blower, to obtain a satisfying cooling effect. In a given plant the cooler temperatures primarily depend upon the quantity of steam to be condensed in the condenser and upon the quantity of cooling air passing through the cooler for the condenser. The lower the condenser temperatures are, the better is, on the one hand, the vacuum in the condenser and the more economically works the locomotive engine, whilst, on the other hand, the quantity of cooling air and therewith the power required to convey it is the greater.

The increase of the quantity of cooling air thus improves the efficiency of the locomotive engine and at the same time increases the power consumption of the auxiliary engines which drive the condenser apparatus, a definite load of the condenser being corresponded to by a quite definite quantity of cooling air which affords the best efficiency of the plant. Now the invention has for its object a device by means of which the rate of revolutions of the blower and thereby the quantity of cooling air, and of the cooling water circulation pump is automatically adapted to the momentary power of the main driving engine of the locomotive and therewith also to the load of the condenser.

The above object is obtained by a regulating device being arranged in the piping supplying working steam to the auxiliary engine that drives the blower of the re-cooling plant and said pump, the regulating member of which device is so influenced by the pressure of the steam supplied to the main driving engine that a variation of the power of the latter is corresponded to by a variation in the same sense of the power of the auxiliary engine which drives the blower of the cooler and said pump.

Figure 1:
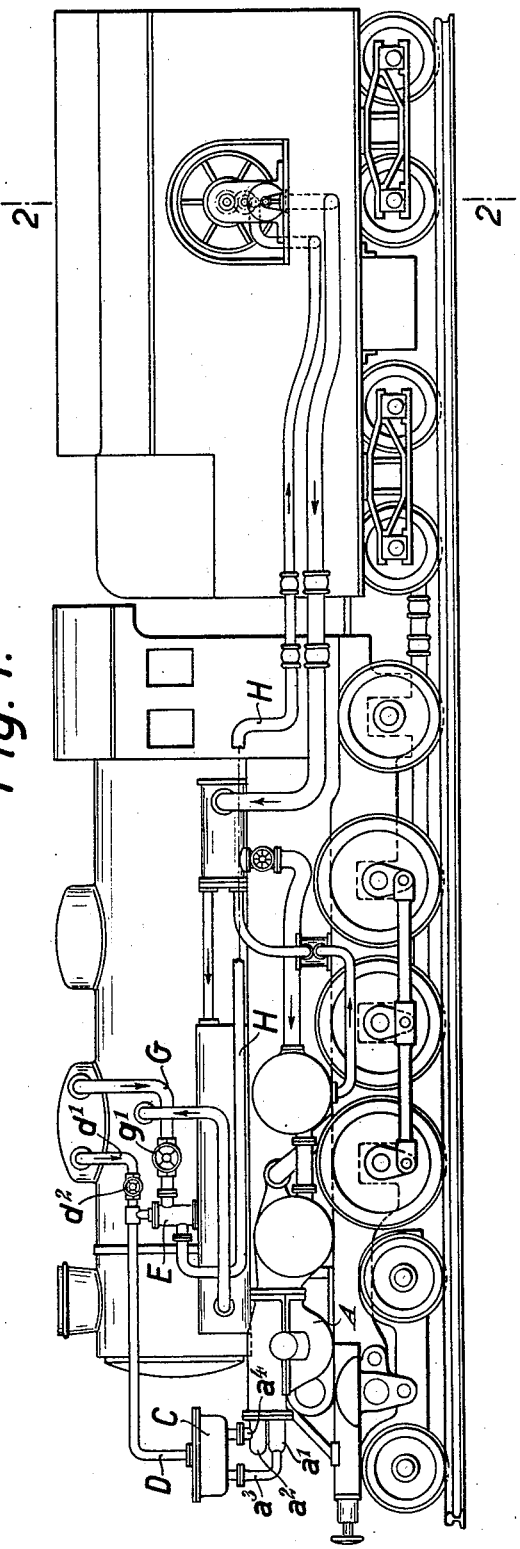
Figure 2:
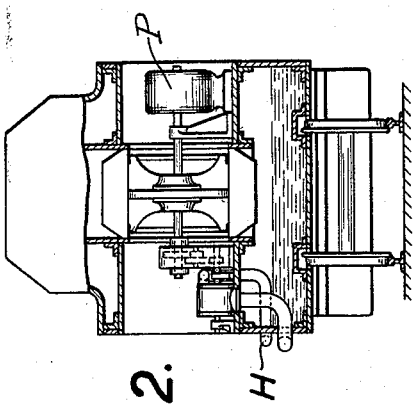

In order that the invention can be more easily understood, an embodiment of the same is illustrated by way of example in the accompanying drawings in which Fig. 1 is a side view of a condensing locomotive fitted with a regulating device according to the invention, Fig. 2 is a cross section on line 2—2 of Fig. 1, Fig. 3 is a view of the regulating means on an enlarged scale, and Fig. 4 is a detailed view partly in section of the regulating element shown in Fig. 1.

A denotes the main driving engine formed by a steam turbine, of the locomotive. This turbine has e. g. two groups of nozzles to which steam is supplied by two live steam pipes $a^1$ and $a^2$ which are fitted with controlling throttle valves $t^1$ and $t^2$ respectively. These throttle valves act as a means of control of the pressure of the steam upon the input side of the turbine A. The pressure of the steam in pipes $a^1$ and $a^2$, controlled by the throttle valves constitutes a measure of the power developed in the turbine A. To the pipes $a^1$ and $a^2$ are connected pipes $a^3$ and $a^4$, respectively, which communicate with tubular sockets $c^1$ and $c^2$ of a collecting case C, throttling disks B, having each a bore $b^1$ being interposed therebetween. In each of the sockets $c^1$, $c^2$ is arranged a check valve $c^3$ and $c^4$, respectively, acted upon by a weak spring $c^5$, as shown in Fig. 3, or closed by gravity in the position of the case C, as shown in Fig. 1. From the collecting case C leads a pipe D to the bore $e^1$ of a valve casing E in which a piston valve F is reciprocable. To pipe D is connected an auxiliary pipe $d^1$ fed with live steam and having a throttling valve $d^2$. The casing E includes two steam chambers $e^2$ and $e^3$ communicating with one another through the bore $e^1$. To chamber $e^2$ is connected a steam pipe G having a throttling valve $g^1$, while a pipe H leads from chamber $e^3$ to the steam turbine which drives the blower of the re-cooling plant and the cooling water circulation pump P. The piston valve F has a bottom aperture $f^1$ and lateral apertures $f^2$ and $f^3$ separated by a full cylindrical shell portion $f^4$. By gravity, (Fig. 3), or under the action of a weak spring $s^1$ of the like, (Figs. 1, 4), the piston valve F tends to assume a position of rest in which its full portion $f^4$ separates the steam chambers $e^2$, $e^3$ from one another. In order to supply steam to the auxiliary turbine, steam pressure must be supplied to the end of F in order to actuate it, which is normally obtained through pipe $d^1$.

Upon the main turbine A being started, valve $d^2$ is closed and valve $g^1$ opened. The piston valve F then moves back to position of rest in which it separates the chambers $e^2$, $e^3$ from one another. Live steam is then supplied from pipes $a^1$ and $a^2$ to one of the pipes $a^3$, $a^4$ or, if the turbine A is under high load, to both pipes and opens one or both check valves $c^3$, $c^4$, so that live steam enters casing E through pipe D below the piston valve F and lifts it. Both check valves are open only in the event that the pressure in both pipes $a^1$ and $a^2$ is the same. Thereupon live steam flows from pipe G through the apertures $f^2$ and $f^3$ through chamber $e^3$ to pipe H. When this takes place, pressure acts upon the inner surface of valve F, which pressure may be suitably throttled, for instance, by valve $g^1$, to allow the valve to be controlled by the pressure in the pipe D as soon as the force resulting from this pressure together with the force resulting from either gravity, (Fig. 3), or the spring, (Fig. 4), becomes equal to that acting upon the outer face of valve F, the latter is prevented from being actuated farther. When the power of the main turbine A increases, the increasing steam pressure effects a further actuation of valve F, (Figs. 3, 4), whereupon an increased quantity of steam is supplied also to pipe H until valve F reaches again a position of equilibrium. Inversely, with decreasing power of the main turbine the quantity of steam supplied to pipe H is reduced. Now the described arrangement is so determined that at any time so much steam is supplied to the auxiliary turbine which drives the blower of the cooler, that the quantity of cooling air delivered by the blower corresponds to the load the condenser is subjected to at that time.

The throttling places B, $b^1$, and $f^1$ prevent an excessive steam consumption in the pipes. The last mentioned port acts as a relief port for the steam acting upon the piston F and does not freely pass the steam impinging upon the external side of the piston end.

When the turbine A is stopped, the piston valve F returns to position of rest. By opening valve $d^2$ steam is supplied again to the outer bottom surface of valve F, so that it is lifted anew and in the described manner reestablishes the connection between the pipes G and H. By virtue of this control the condenser auxiliaries may be operated independently of the main turbine.

I claim:—

1. In a condensing locomotive a main driving steam engine, a blower adapted to supply cooling air to the condensing plant, an auxiliary steam engine adapted to drive said blower, and a regulating device in the pipe supplying working steam to said auxiliary engine, a branch pipe connecting the regulating member of said device to the working steam supply pipe of said main engine to cause said regulating device to vary the supply of steam to said auxiliary engine according to and in the same sense as a variation of the steam supplied to the main driving engine, and a throttling means in said branch pipe.

2. In a condensing locomotive a main driving steam engine, a blower adapted to supply cooling air to the condensing plant, an auxiliary steam engine adapted to drive said blower, a regulating device in the pipe supplying working steam to said auxiliary engine, said device comprising a casing, a piston valve adapted to reciprocate therein, a pipe connecting said casing to the pipe supplying steam to said main engine on one side of said piston valve, whereby said piston valve is positioned in accordance with the amount of steam supplied to said main engine, the pipe supplying steam to said auxiliary engine opening into said casing on the other side of said piston valve.

3. In a condensing locomotive a main driving steam engine, a blower adapted to supply cooling air to the condensing plant, an auxiliary steam engine adapted to drive said blower, a regulating device in the pipe supplying working steam to said auxiliary engine, said device comprising a casing, a hollow piston valve adapted to reciprocate therein and having a transverse wall with a throttling hole, a pipe connecting said casing to the pipe supplying steam to said main engine on one side of said transverse wall, whereby said piston valve is positioned in accordance with the amount of steam supplied to said main engine, the pipe supplying steam to said auxiliary engine opening into said casing on the other side of said wall.

4. In a condensing locomotive a main driving steam engine, a blower adapted to supply cooling air to the condensing plant, an auxiliary steam engine adapted to drive said blower, a regulating device in the pipe supplying working steam to said auxiliary engine, said device comprising a casing, a hollow piston valve adapted to reciprocate therein and having a transverse wall with a throttling hole, a pipe connecting said casing to the pipe supplying steam to said main engine on one side of said transverse wall, whereby said piston valve is positioned in accordance with the amount of steam supplied to said main engine, the pipe supplying steam to said auxiliary engine opening into said casing on the other side of said wall, and a live steam supply pipe connected to said pipe connecting said regulating device to the main driving engine.

5. In a condensing locomotive a main driving steam engine, a blower adapted to supply cooling air to the condensing plant, an auxiliary steam engine adapted to drive said blower, a regulating device in the pipe supplying working steam to said auxiliary engine, said device comprising a casing, a hollow piston valve adapted to reciprocate therein and having a transverse wall with a throttling hole, a pipe connecting said casing to the pipe supplying steam to said main engine on one side of said transverse wall, whereby said piston valve is positioned in accordance with the amount of steam supplied to said main engine, the pipe supplying steam to said auxiliary engine opening into said casing on the other side of said wall, a live steam supply pipe connected to said pipe connecting said regulating device to the main driving engine, and a check valve in said latter pipe.

6. The combination with a condensing locomotive recited in claim 1 wherein a tensioned check valve is inserted between the throttling point and regulating member.

7. The combination with a condensing locomotive recited in claim 4, wherein a check valve is inserted in the second-mentioned pipe, connecting the casing to the pipe supplying steam to the main engine.

The foregoing specification signed at Zurich, Switzerland, this 2nd day of April, 1929.

ERICH BURMEISTER.